Patented Apr. 17, 1951

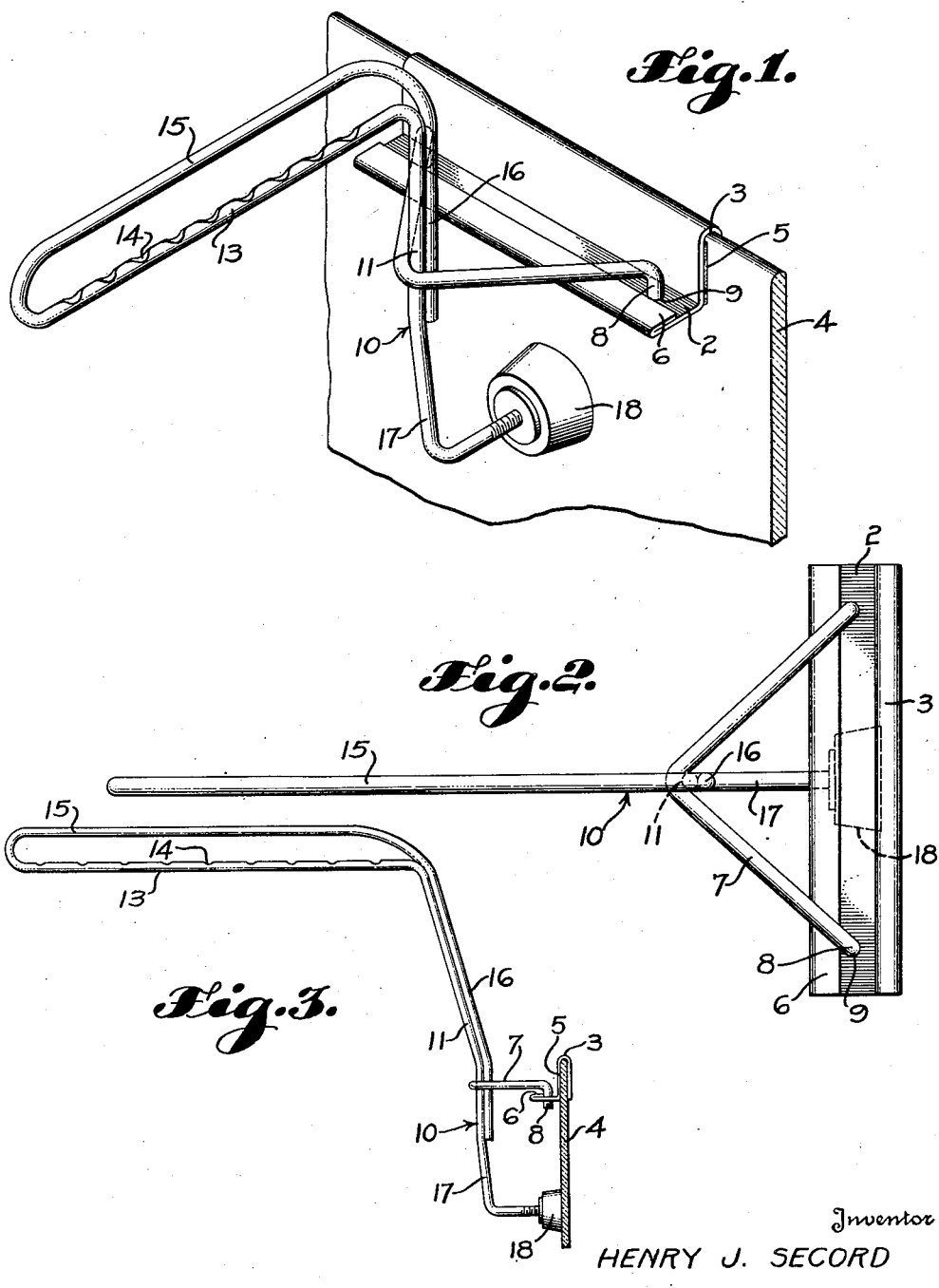

2,549,391

UNITED STATES PATENT OFFICE 2,549,391

AUTOMOBILE BRACKET

Henry J. Secord, Los Angeles, Calif.

Application July 26, 1948, Serial No. 40,660

3 Claims. (Cl. 211—86)

This invention relates to a bracket particularly designed to be loosely attached to an automobile window and, when so attached, to provide a means from which garments mounted on hangers may be suspended.

It is the general object of the present invention to provide a simple and economical form of a bracket which may be loosely attached or substantially merely rested upon a window of an automobile, and when so attached, will provide a horizontal extending arm adapted to serve for mounting garments. Another object of the present invention is to provide a bracket which will provide a suspension point for garments which will be located at a higher level than the top of the windows of an automobile.

In accordance with the present invention, a bracket is provided which includes a channel from which the bracket is adapted to be supported on the edge of an automobile window. This channel member is connected by a V-shaped rod to the suspension member. The suspension member in turn is formed of a single rod, the central part of which is folded to provide a garment suspending loop. From this loop, the two ends of the rod extend downwardly in substantial contact with each other and one of the lower ends of the rod is turned inwardly to engage a bumper contacting the side of the window. By this construction, I am able to provide very economically a garment hanging bracket, which may be readily positioned on an automobile window and removed therefrom in position. The supporting member extends upwardly considerably above the top of the window so as to provide adequate height for suspension of garments.

The bracket of the present invention, together with various further objects and advantages of the invention, will be fully understood from the following description of the present form of the invention, which description is given in connection with the accompanying drawings, in which:

Figure 1 is a perspective view of the automobile bracket of the present invention engaged in position on the edge of a window.

Figure 2 is a plan view.

Figure 3 is a side elevation.

Referring to the drawings, the bracket of the present invention comprises a member 2 in the form of a metal plate, one portion of which is folded as indicated at 3, to provide an elongated channel of substantially the width of an ordinary pane of glass 4 such as is employed in and for an automobile window. In certain cases there may be employed felting 5 on the inner surfaces of the channel where the same contacts a window pane 4. From the folded channel section 3 the member 2 extends horizontally inwardly and preferably has its inner edge folded back as indicated at 6, to provide a rounded surface.

A V-shaped rod 7 is provided, the major portion of which lies at a substantially horizontal plane, but the ends thereof are bent vertically downwardly as indicated at 8 and fit tightly within openings 9 in the member 2; if desired, they may be welded to the member 2.

The supporting member 10 of the bracket is in the form of a single rod which extends from the end 11 upwardly and then is bent in a horizontal direction as indicated at 13. Preferably, the angle between the portions 11 and 13 of the rod may be somewhat greater than a right angle in order that the portion 13 will lie horizontally when the bracket is installed on window 4, which slopes somewhat inwardly.

The portion 13 may, if desired, be provided with a number of indentations 14 for assisting in maintaining garment hangers on the member, spaced apart from each other. From the section 13 the rod is bent backwardly to provide a loop. The portion 15 lies somewhat above the portion 13 and parallel thereto. At the end of the portion 15, the rod is turned downwardly as indicated at 16 and in contact with the portion 11. In certain cases, these portions may be welded or pressed together. The portions 11 and 16 of the rod pass through the apex of the member 7 and may be there brazed or welded to said member. Below the member 7 the rod extends, as indicated at 17, to a corner where the rod has been turned horizontally inwardly and terminates in contact with a bumper member 18. The bumper member 18 is indicated in a form of substantially frusto-conical block of soft material such as rubber, designed to engage the side of the window pane 4 and to brace the suspension member from the window pane.

The bracket herein described may be installed in position merely by being set in position on the window pane, but when so installed, will maintain itself firmly in position. The suspended portion 13 of the bracket will be disposed in a substantially horizontal position at a considerable elevation above the edge of the pane 4 extending substantially to the roof of the automobile in which the same is used. By the bracket, there is therefore provided a means for suspending garments substantially from the roof of the automobile car.

The two portions 13 and 15 of the rod-like supporting member, which substantially define an elongated horizontally extending loop, lie sufficiently apart as to allow garment hangers to be readily inserted into the loop so as to rest on a portion 13, with the portion 15 lying thereabove in position to offer some resistance to the hangers being vibrated from their position. The garment hanger may be installed so that the garments hang within an automobile body or could be reversed in position at any time so that skis, fishing poles, etc. will hang on the outside of an automobile body. When not in use, the bracket is merely lifted from position where it is supported by the window pane. The bracket of the present invention provides a very simple and economical means by which, when desired, garments may be supported from the edge of the window pane of an automobile.

While the particular form of the bracket herein described is well adapted to carry out the objects of the invention, various modifications and changes may be made, and this invention is of the scope set forth in the appended claims.

I claim:

1. A garment suspension bracket for an automobile which comprises a member having a channel formed to receive the upper edge of a window pane, a garment supporting member formed of a rod, a central portion of which is bent back on itself to form an elongated open loop, means for attaching said garment supporting member to the channel member so that the elongated loop of the garment member will lie substantially horizontally and at an elevation above the window pane edge when the bracket is installed on said edge, the garment supporting member having one end terminating in a bumper member disposed below the channel member and adapted for pressing against the side of the window pane supporting the bracket.

2. A garment supporting bracket for an automobile which comprises a plate having a portion thereof folded to form a channel for receiving the upper edge of a window pane and having a member extending laterally from the channel portion, a supporting member formed of a rod, a medial portion of which is folded back to form an open elongated loop which lies in a substantially horizontal plane, the free ends of the rod from the loop extending in substantial alignment from the loop downwardly, means engaging the downwardly extending ends of the rod and the plate member for fastening the supporting member to the plate member so that the elongated loop is at a substantial elevation above the plate member, one of the free ends of the rod forming the supporting member extending below the fastening point with respect to said plate member and being there turned inwardly and terminating in a bumper member for engagement with the side face of a window pane.

3. A bracket for supporting garments from an automobile window pane, which bracket comprises a plate member having a portion thereof folded to form a channel for receiving the upper edge of a window pane and supporting the bracket therefrom, said plate member having a laterally extended portion, a rod-like supporting member extending from the plate member to supporting contact with the garment supporting member, said garment supporting member being formed of a rod, the medial portion of which is folded into an elongated substantially horizontally extending loop, from one end of which the rod extends downwardly for a distance before contacting said supporting member so that said loop lies vertically above said plate member, one of the free ends of the rod members extending below the point of support and being there bent inwardly and terminating in a bumper for engaging the side face of a window pane supporting said bracket.

HENRY J. SECORD.

REFERENCES CITED

The following references are of record in the file of this patent:

UNITED STATES PATENTS

| Number | Name | Date |
| --- | --- | --- |
| 2,070,408 | Leidgen | Feb. 9, 1937 |
| 2,157,001 | Morley | May 2, 1939 |
| 2,302,300 | Davies | Nov. 17, 1942 |
| 2,344,339 | Zwald | Mar. 14, 1944 |
| 2,461,722 | Coons | Feb. 15, 1949 |
| 2,474,513 | Behrens | June 28, 1949 |